United States Patent Office 3,366,670
Patented Jan. 30, 1968

3,366,670
PREPARATION OF CYCLOHEXYLSULFAMIC
ACID OR METAL SALTS THEREOF
Oscar G. Birsten, New York, N.Y., and Jacob Rosin, Maplewood, N.J., assignors to Baldwin-Montrose Chemical Company, Incorporated, a corporation of Indiana
No Drawing. Filed Sept. 19, 1963, Ser. No. 310,127
3 Claims. (Cl. 260—501.12)

This invention relates to a novel process for the preparation of cyclohexylsulfamic acid or its metal salts.

The known methods for the preparation of cyclohexylsulfamic acid and its salts are based mainly on either reacting chlorosulfonic acid with cyclohexylamine in the presence of excess amine to neutralize the cyclohexylsulfamic and the hydrochloric acids or reacting the cyclohexylamine with sulfamic acid or its salts. The drawbacks of the first approach are the relatively low yield due to a number of side reactions and the necessity of using two extra moles of amine per mole of reaction product as acid acceptors which have to be recovered. The drawbacks of the second approach are the relatively high cost of sulfamic acid and the low yields.

The principle of the process consists in reacting a lower trialkyl amine with $SO_3$ to form the complex $R_3N \cdot SO_3$. The trialkyl amine is one wherein the alkyl radicals are chosen from the group consisting of methyl, ethyl, propyl and combinations thereof. Thereupon this complex is reacted with cyclohexylamine to form the $R_3N$-salt of cyclohexylsulfamic acid, which can either be in turn reacted with a metal base, forming the desired metal cyclohexylsulfamate and recovering the invested trialkylamine, or the free acid can be liberated by acidification or by ion exchange. The free acid can, if desired, then be further reacted by known means to form the metal salt. The reaction between $SO_3$ ad $R_3N$ can be carried out either in gas-phase or, preferably, in a medium of an inert solvent resistant to $SO_3$, such as the various halogenated aliphatic hydrocarbons such as perchloroethylene, chloroform, trichloroethylene, carbon tetrachloride, trichlorofluoro methane, 1-1-1-dichlorofluoro, -2-2-2-chlorofluoro ethane, 1-1-dibromo ethane or the like. We prefer to use perchloroethylene.

The reaction between the $R_3N \cdot SO_3$ complex and cyclohexylamine can be carried out in the same solvent or in a great variety of other solvents, but the volumes involved are relatively large due to the bulk of the amine salt of the cyclohexylsulfamic acid.

The object of this invention is a process whereby practically quantitative yields (based on non-recovered cyclohexylamine) are obtained in a simple procedure requiring only one mole of amine or a small excess as acid acceptor and permitting the use of the inexpensive $SO_3$ as a raw material for the sulfamation.

Another feature of this invention is that the reaction is carried out in an aqueous medium which permits the dissolution of the above-mentioned salt. However, in view of relatively poor solubility of cyclohexylamine salt of cyclohexylsulfamic acid, there is a tendency for this salt to form and precipitate even in the presence of the stronger base, as is being represented by the trialkylamine in this reaction. This has two drawbacks—first, it takes part of the cyclohexylamine out of the reaction of sulfamate formation and it also forms a voluminous precipitate, interfering with separation of the aqueous and organic layers and requiring a relatively large volume of water for achieving stirrability.

Another feature of this invention is that the reaction is carried out above 60° C., preferably at 70° C., at which temperature the solubility or the dissociation of the cyclohexylamine salt of cyclohexylsulfamic acid is such that it does not precipitate and allows the formation of the very water-soluble trialkylamine salt and practically complete utilization of cyclohexylamine for the formation of the cyclohexylsulfamic acid.

Another feature of this invention consists in reversing the addition sequence and adding the cold complex slurry or solution to the preheated aqueous solution of cyclohexylamine. This prevents the exposure of the relatively unstable complex to heat prior to its reaction with the cyclohexylamine.

Any base can be used to form the corresponding salt, but it is preferred to use either calcium hydroxide or sodium hydroxide.

In order to secure optimum yields, stoichiometric quantities of $SO_3$ and cyclohexylamine and a slight excess of trialkylamine are preferably employed, but substantial departures from these quantities can be made.

The invention is illustrated by the following non-limiting examples.

EXAMPLE 1

Eighty g. $SO_3$ dissolved in 320 g. perchloroethylene is added slowly under stirring to a solution of 70 g. trimethylamine in 140 g. perchloroethylene precooled to −10° C. and maintained at this temperature throughout the addition. After the end of addition, agitation and cooling is maintained for another hour; then the slurry of the complex formed in this reaction is added under stirring to a solution of 99 g. cyclohexylamine in 300 g. water at 70° C. and maintained at that temperature throughout the addition. After the end of addition, the upper aqueous layer containing the trimethylamine salt of cyclohexylsulfamic acid is separated from the lower perchloroethylene layer. Then 45 g. calcium hydroxide is added, the liberated trimethylamine is boiled out and recovered by heating the solution to reflux; the calcium salt of cyclohexylsulfamic acid is isolated by filtration from $Ca(OH)_2$ excess, evaporation of most of the filtrate water followed by cooling and crystallization. The yield is 93–94% of theory based on the cyclohexylamine invested and practically quantitative based on non-recovered cyclohexylamine.

EXAMPLE 2

Eighty g. $SO_3$ is added dropwise under stirring and cooling to maintain a −10° C. temperature to 112 g. triethylamine dissolved in 750 g. chloroform. To the resulting complex solution a mixture of 99 g. cyclohexylamine and 10 g. triethylamine was added at 20–25° C., stirred for one hour after the end of addition, and 500 g. water added, the upper aqueous layer containing the triethylamine salt of the cyclohexylsulfamic acid separated from the lower $CHCl_3$ layer, and 50 g. sodium hydroxide added to the aqueous layer. The triethylamine liberated is recovered and the sodium salt is isolated as in Example 1.

EXAMPLE 3

Eighty g. $SO_3$ dissolved in 320 g. perchloroethylene is added to 165 g. tripropylamine dissolved in 300 g. perchloroethylene maintained at 40° C. The resulting complex slurry is added to a solution of 99 g. cyclohexylamine in 3 liters water at 70° C. and the tripropylamine salt of cyclohexylsulfamic acid so obtained is then transformed into the free acid by flowing the solution through an ion exchange column having an acid cation exchange resin therein, resulting in an effluent of the free acid.

We claim:

1. The process of preparing the $R_3N$ salt of cyclohexyl sulfamic acid which comprises reacting $R_3N$ and $SO_3$, R being methyl, ethyl or propyl, to produce the complex $R_3N \cdot SO_3$ and then reacting said complex with an aqueous solution of cyclohexylamine at a temperature of from about 60° to about 70° C. to obtain an aqueous solution of the said $R_3N$ salt.

2. A method in accordance with claim 1 wherein the $R_3N \cdot SO_3$ complex is added to the aqueous cyclohexylamine solution.

3. The process wherein a base selected from the group consisting of sodium hydroxide and calcium hydroxide is added to the aqueous solution of the $R_3N$ salt of cyclohexylsulfamic acid produced in the process of claim 1 to form the corresponding metal salt and liberate trialkylamine and said trialkylamine is evaporated from said solution.

References Cited

UNITED STATES PATENTS

| 2,275,125 | 3/1942 | Audrieth et al. | 260—500 |
| 2,655,528 | 10/1953 | Hardy et al. | 260—500 |
| 2,814,640 | 11/1957 | Golding | 260—501 |
| 3,226,430 | 12/1965 | Mhatre | 260—501 |

FOREIGN PATENTS

| 669,200 | 3/1952 | Great Britain. |

OTHER REFERENCES

Allied Chemical, "Reactions of Sulfur Trioxide" (1959) pp. 5 and 6.

LEON ZITVER, *Primary Examiner.*

J. E. EVANS, *Assistant Examiner.*